DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 24, 1973

912 O.G. 1235

T912,018

PROCESS FOR PREPARING A BONDED ARTICLE AND PRODUCT THEREOF

Michael John Maskornick, 530 Marsh Road, Wilmington, Del. 19809

Continuation-in-part of application Ser. No. 280,889, Aug. 15, 1972. This application Jan. 10, 1973, Ser. No. 322,687

Int. Cl. C09j *5/00;* B32b *15/08*

U.S. Cl. 156—333

No Drawing. 16 Pages Specification

A process for producing a laminate of a metal selected from the group consisting of aluminum, copper, iron, titanium, nickel and alloys thereof with a perfluorinated elastomeric polymer prepared by polymerizing the following monomers:

$CF_2{=}CF_2$, $CF_2{=}CFOCF_3$, and $CF_2{=}CFOR_f$ wherein $R_f$ is selected from the group consisting of (1)

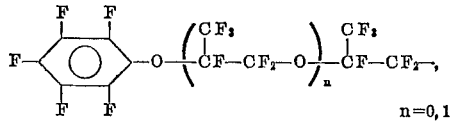

n=0, 1

(2)

$-(CF_2)_n-X$ X=CN, COF, $CO_2H$, $CO_2R_1$, $CO_2M$, or $CONR_2R_3$
M=alkali metal
$R_1$=alkyl radical of $C_1$—$C_{10}$
$R_2$, $R_3$=$R_1$ or hydrogen or combinations thereof
n=2–12, (3)

$-CF_2CFY-(OCF_2CFY)_n-OCF_2CFR'_fSO_2M'$ $R'_f$=perfluoroalkyl of $C_1$—$C_{10}$
Y=F, $CF_3$,
n=1, 2
M'=F, OH, $NH_2$, OMe where
Me=alkali metal or quaternary ammonium or (4)

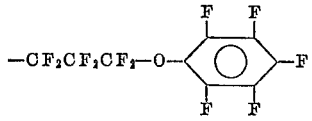

which comprises coating said metal with an adhesive, placing said perfluorinated polymer, in the uncured state, on said adhesive, thereby forming an assembly, applying pressure to said assembly, heating the assembly to a temperature of about 170 to 250° C. for a period of 10 to 240 minutes, reducing the temperature to about ambient to 100° C., reducing said pressure to about ambient and recovering a laminate of said metal, said adhesive and said polymer.

The resulting product may be used as a solvent-resistant lining for tank cars or formed into a roll for various purposes such as use as a tin plate roller.